Figure 1:
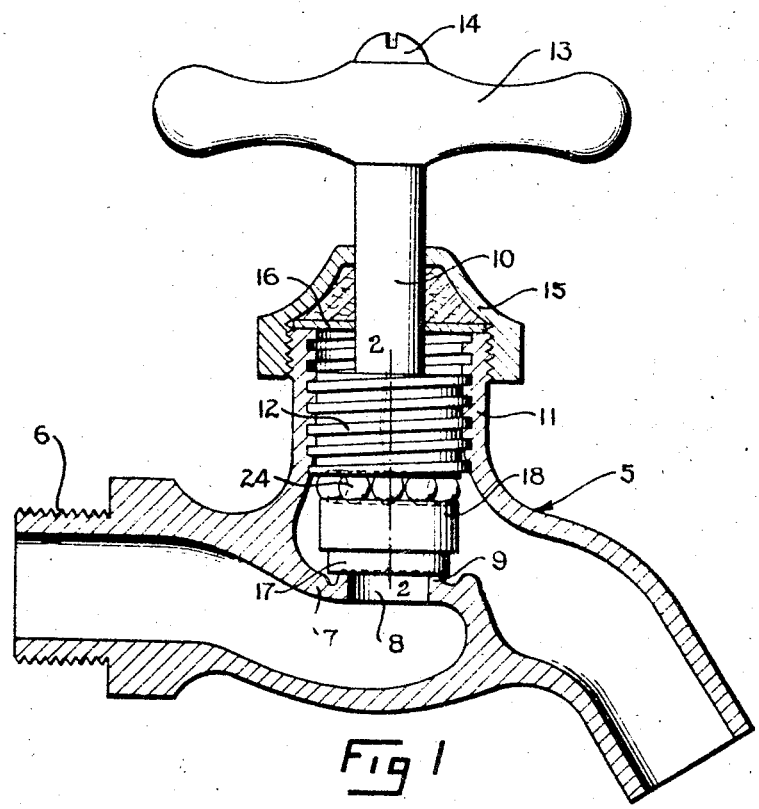

Oct. 1, 1940.  N. J. SICLARI  2,216,459

VALVE

Filed April 12, 1939

INVENTOR
Nicholas J. Siclari
BY
F. Bascom Smith
ATTORNEY

Patented Oct. 1, 1940

2,216,459

UNITED STATES PATENT OFFICE 2,216,459

VALVE

Nicholas J. Siclari, St. George, Staten Island, N. Y.

Application April 12, 1939, Serial No. 267,365

2 Claims. (Cl. 251—46)

This invention relates to faucets and more particularly to valve mechanism therefor.

Considerable difficulty has been encountered in the solution of a problem long recognized in the art of faucet manufacture although the latter is old and highly developed. This problem involves the provision in a single faucet of suitable means for permanently securing the washer retainer to the valve stem and suitable means for permitting relative rotation of the valve stem to the washer when the latter engages its seat. Devices which successfully embody this last-named feature by providing a bearing whereby the valve stem applies only a negligible turning torque to the washer have inadequately met the requirement for a permanent connection between the washer retainer and the valve stem. These last-named devices resort to a screw which extends through and engages the washer retainer and threads into the valve stem with the result that the constant use to which a faucet is normally subjected loosens and frees the screw, rendering the valve completely ineffective and frequently necessitating replacement of parts intended to constitute the permanent structure of the faucet. In structures where this defect is obviated by some form of semi-permanent connection, the relation of the several parts constituting said connection prevents the provision of adequate bearing means between the washer and the valve stem and, as a result, a substantial turning torque is applied to the washer after the latter is seated. The washer thus tends to become ground out by the frictional force applied thereto by the washer seat and quickly becomes defective as a fluid seal, causing leakage and necessitating frequent replacements.

Accordingly, it is an object of the present invention to provide a novel faucet valve mechanism comprising a washer and a seat therefor, said mechanism having the retaining means for the washer permanently secured to the valve stem and also having means interposed between said retaining means and said stem whereby only a negligible turning torque is transmitted from said stem to said retaining means.

Another object is to provide a novel valve mechanism of the above type comprising a minimum number of structural parts which are readily assembled to produce a structure reliable in operation and inexpensive to manufacture.

The above and other objects and novel features of the present invention will appear more fully from the following detailed description when the same is read in connection with the accompanying drawing. It is to be expressly understood, however, that the drawing is for purposes of illustration only and is not intended as a definition of the limits of the invention, reference being primarily had for this latter purpose to the appended claims.

Figure 2:
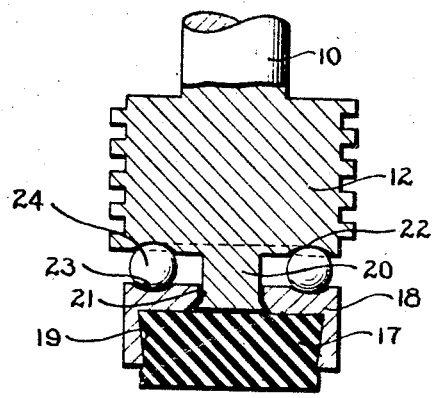

In the drawing, wherein like reference characters refer to like parts throughout the several views, Fig. 1 is a vertical longitudinal sectional view, partly in elevation, of a faucet embodying a form of valve mechanism constructed in accordance with the present invention; and, Fig. 2 is an enlarged sectional view taken substantially along line 2—2 of Fig. 1.

In the single embodiment of the invention illustrated in the drawing by way of example, a faucet 5 of the type well known in the art is provided, said faucet having a threaded end 6 adapted to screw into a water pipe line (not shown) and also having a diaphragm 7 formed integrally therewith and extending in a substantially horizontal plane across the fluid passage through said faucet. A port 8 is provided in diaphragm 7 to permit the flow of fluid through the faucet and a raised flange portion 9 surrounds said port and serves as a valve seat. In order to provide the usual casing and guide for a valve stem 10, a cylindrical sleeve 11 is formed integrally with faucet 5, said sleeve being threaded internally and externally and said valve stem extending therein. An enlarged cylindrical portion 12, formed at the lower end of stem 10, is externally threaded to screw into said sleeve, the upper end of said stem being squared and having a handle 13 which fits therein and is secured thereto by a screw 14. To prevent any fluid leakage along stem 10, a cap or gland nut 15 which fits closely around said stem is screwed on sleeve 11 and a metal washer 16 is preferably held between said nut and said washer, being filled with suitable packing material, such as rubber or felt, which is compressed therein.

The fluid flow through port 8 is controlled by a packing washer 17 which cooperates with seat 9 to limit the size of the fluid passage, said packing washer being adapted to engage said seat and be compressed thereon to completely shut off the fluid flow through said faucet. As shown, packing washer 17 is carried by retaining means which comprise an inverted cup-shaped member or cap 18 having the sides 19 of the recess therein converging inwardly toward the open end of said recess, said washer being forced into said recess and being firmly held therein by the converging sides.

When washer 17 engages seat 9, it is highly desirable to prevent said washer from being rotated with stem 10 while the latter rotates to apply a further downward compressive force to said washer. If this desired result is not attained, washer 17 would be ground by the frictional force tending to resist the rotation thereof.

It is equally desirable to secure member 18 to stem 10 by a permanent connection and thereby avoid the possibility of having said member loosen and become free and thereby render the valve ineffective. Accordingly, novel means for rotatably mounting member 18 to stem 10 are provided and comprise a pin 20 formed integrally with the lower end of said stem and extending through an opening 21 centrally located in said member, the fit between said pin and said opening being preferably loose in order to prevent the transmission of a turning torque to said member. The lower portion of opening 21 flares outwardly and pin 20 is spun or otherwise caused to become enlarged at the end thereof to fit this greater space, the permanent deformation of said pin providing a permanent connection whereby upward movements of stem 10 are imparted to member 18.

To transmit a downward pressure of stem 10 to member 18 without transmitting the turning movement of said stem thereto, a suitable bearing arrangement between said stem and member is provided. For this purpose, annular grooves 22 and 23 are formed in the lower end of stem 10 and in the upper face of member 18, respectively, said grooves serving as races for balls 24 which are positioned therein. A ball bearing is thus produced which transmits a downward force uniformly to member 18 and therefore to washer 17 and permits free rotation of stem 10 relative to member 18.

There is thus provided a novel valve mechanism particularly adapted for utility in a faucet, said mechanism being extremely reliable in performance because of the permanency of the assembly thereof and preserving the washer for a maximum period of effective service by substantially eliminating the application of grinding friction forces to said washer. Furthermore, the novel device comprises a minimum number of structural parts, said parts being adapted for ready assembly, thus reducing the cost of manufacture and of material and increasing the reliability of operation of said device.

Although only a single embodiment of the invention has been illustrated and described, it is to be expressly understood that the same is not limited thereto. For example, it will now be apparent to those skilled in the art that the valve mechanism may be readily applied to faucet structures different in shape from that illustrated in the drawing but operating on the same principle. Various other changes may be made in the design and arrangement of parts without departing from the spirit and scope of the invention. For a definition of the invention, reference will be had primarily to the appended claims.

What is claimed is:

1. A faucet comprising a body having a valve seat, a valve stem having an integrally formed threaded end operatively connected with said body and an integrally formed pin extending downwardly from said end, a washer adapted to seat on said valve seat, a washer retaining member having an opening with a flared lower portion formed therein, said pin extending freely through said opening and being permanently secured to said member by having a lower end of greater diameter than the smallest diameter of said opening, and a ball bearing between said member and said stem comprising balls interposed between said member and said stem and grooves formed in the latter serving as races.

2. A faucet comprising a body having a valve seat, a valve stem having an integrally formed threaded end operatively connected with said body and an integrally formed pin centrally located and extending downwardly from said end, a washer adapted to seat on said seat and prevent the flow of fluid through said faucet, a washer retaining member with a recess formed therein having walls converging in the direction of the open end of said recess and having an opening centrally located in the wall comprising the closed end of said recess, said pin extending freely through said opening and being permanently secured to said member by having a lower end of greater diameter than the smallest diameter of said opening, said washer fitting into said recess and being firmly held therein by the converging walls thereof, and a ball bearing between said member and said stem comprising balls interposed between said member and said stem in annular grooves formed in said member and said stem.

NICHOLAS J. SICLARI.